US010420070B2

United States Patent
Lau et al.

(10) Patent No.: US 10,420,070 B2
(45) Date of Patent: *Sep. 17, 2019

(54) MOBILITY MANAGEMENT ENTITY SUPPORT OF USER EQUIPMENT USING EXTENDED DISCONTINUOUS RECEPTION AND POWER SAVING MODE

(71) Applicant: Verizon Patent and Licensing Inc., Arlington, VA (US)

(72) Inventors: Priscilla Lau, Fremont, CA (US); Suzann Hua, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/241,562

(22) Filed: Jan. 7, 2019

(65) Prior Publication Data
US 2019/0141671 A1  May 9, 2019

Related U.S. Application Data

(63) Continuation of application No. 15/784,467, filed on Oct. 16, 2017, now Pat. No. 10,212,690.

(51) Int. Cl.
*H04W 68/02* (2009.01)
*H04W 84/02* (2009.01)
(Continued)

(52) U.S. Cl.
CPC ............ *H04W 68/02* (2013.01); *H04W 4/14* (2013.01); *H04W 40/005* (2013.01);
(Continued)

(58) Field of Classification Search
CPC ... H04W 64/00; H04W 64/003; H04W 68/00; H04W 68/005; H04W 68/02; H04W 68/04; H04W 68/06; H04W 68/08; H04W 88/18; H04W 88/185; H04W 88/02; H04W 88/00; H04W 88/08; H04W 88/16; H04W 88/12; H04W 88/14; H04W 84/027; H04W 52/00; H04W 52/02; H04W 52/0219; H04W 52/0212; H04W 52/0203; H04W 68/12; H04W 52/0209; H04W 4/14; H04W 40/005; H04W 68/025; H04W 84/02;
(Continued)

(56) References Cited

U.S. PATENT DOCUMENTS 8,817,705 B2    8/2014  Yin et al.
9,450,661 B2 *  9/2016  Yu et al. ............... H04B 7/0623
(Continued)

*Primary Examiner* — Meless N Zewdu

(57) ABSTRACT

Systems and methods described herein provide improved access to wireless devices in Power Saving Mode (PSM) and extended Discontinuous Reception (eDRX) sleep. A mobility management entity (MME) receives a wake-up time request for a wireless device, wherein the wake-up time request includes a designated wake-up time for the wireless device to receive data services. The MME device stores the designated wake-up time when the designated wake-up time is after a current tracking area update (TAU) window for the wireless device and receives, after the storing, a TAU request for the wireless device. The MME device sends, in response to the TAU request, a TAU response that includes the designated wake-up time.

20 Claims, 12 Drawing Sheets

(51) Int. Cl.
*H04W 64/00* (2009.01)
*H04W 52/00* (2009.01)
*H04W 52/02* (2009.01)
*H04W 4/14* (2009.01)
*H04W 40/00* (2009.01)
*H04W 88/02* (2009.01)
*H04W 76/28* (2018.01)
*H04W 68/00* (2009.01)
*H04W 68/12* (2009.01)

(52) U.S. Cl.
CPC ........... *H04W 52/00* (2013.01); *H04W 52/02* (2013.01); *H04W 52/0209* (2013.01); *H04W 52/0248* (2013.01); *H04W 64/00* (2013.01); *H04W 64/003* (2013.01); *H04W 68/00* (2013.01); *H04W 68/025* (2013.01); *H04W 68/12* (2013.01); *H04W 76/28* (2018.02); *H04W 84/02* (2013.01); *H04W 84/027* (2013.01); *H04W 88/02* (2013.01)

(58) Field of Classification Search
CPC . H04W 76/28; H04W 52/0248; H04W 40/00; H04W 60/06; H04W 8/16; H04W 4/029
See application file for complete search history.

(56) References Cited

U.S. PATENT DOCUMENTS

| | | | |
|---|---|---|---|
| 9,504,012 B1* | 11/2016 | Ljung et al. .......... | H04W 68/02 |
| 9,564,958 B2* | 2/2017 | Marinetz et al. .... | H04B 7/0626 |
| 9,999,020 B2* | 6/2018 | Kim et al. ............ | H04W 68/02 |
| 10,148,331 B2* | 12/2018 | Yu et al. .............. | H04B 7/0617 |
| 10,212,690 B1* | 2/2019 | Lau et al. ............. | H04W 76/28 |
| 2013/0136072 A1 | 5/2013 | Bachmann et al. | |
| 2014/0242970 A1 | 8/2014 | Yu et al. | |
| 2015/0071169 A1 | 3/2015 | Wang | |
| 2015/0223197 A1 | 8/2015 | Kim et al. | |
| 2015/0237592 A1 | 8/2015 | Kim et al. | |
| 2015/0304986 A1 | 10/2015 | Eriksson et al. | |
| 2015/0365914 A1 | 12/2015 | Yu et al. | |
| 2016/0128078 A1 | 5/2016 | Murthy et al. | |
| 2016/0183156 A1 | 6/2016 | Chin et al. | |
| 2016/0219511 A1 | 7/2016 | Yang et al. | |
| 2016/0262045 A1 | 9/2016 | Yang et al. | |
| 2016/0286385 A1 | 9/2016 | Ryu et al. | |
| 2017/0078968 A1 | 3/2017 | Shi et al. | |
| 2017/0142679 A1 | 5/2017 | Landais et al. | |
| 2017/0164286 A1 | 6/2017 | Jeong et al. | |
| 2017/0230817 A1 | 8/2017 | Ryu et al. | |
| 2017/0273053 A1 | 9/2017 | Ryu et al. | |
| 2017/0311247 A1 | 10/2017 | Qi et al. | |
| 2017/0339611 A1 | 11/2017 | Landais et al. | |
| 2017/0374542 A1 | 12/2017 | Ryu et al. | |
| 2018/0054799 A1 | 2/2018 | Starsinic et al. | |
| 2018/0092154 A1 | 3/2018 | Al | |
| 2018/0115923 A1 | 4/2018 | Chandramouli et al. | |
| 2018/0124764 A1 | 5/2018 | Lee | |
| 2018/0263014 A1 | 9/2018 | Diachina et al. | |

* cited by examiner

US 10,420,070 B2

MOBILITY MANAGEMENT ENTITY SUPPORT OF USER EQUIPMENT USING EXTENDED DISCONTINUOUS RECEPTION AND POWER SAVING MODE

CROSS REFERENCE TO RELATED APPLICATION

This application is a continuation of U.S. patent application Ser. No. 15/784,467 filed on Oct. 16, 2017, the disclosure of which is hereby incorporated by reference.

BACKGROUND

Power Saving Mode (PSM) and extended Discontinuous Reception (eDRX) are specified by the Third Generation Partnership Project (3GPP) as part of wireless networks' evolution to cater to Internet-of-Things (IoT) and machine-to-machine (M2M) requirements. PSM enables user equipment (UE) to enter a deep-sleep mode for long periods of time after notifying the base station. eDRX allows UEs to have longer sleep periods between a UE's paging checks. Such features reduce the amount of power associated with frequent communication requests normally sent by a base station. eDRX and PSM form a key part of the power-saving strategy for IoT devices, and provide important and significant improvements in terms of battery life for applications such as alarms, smart meters and other sensors, as well as lowering device costs.

When a UE is in a sleep period (e.g., for either PSM or eDRX), the UE cannot receive data or respond to page requests. Unless an application server (AS) is informed of a UE's active (or wake-up) window, when the AS attempts to send a short message (SM) or other data to a UE in PSM or eDRX, there will be a high likelihood that the UE is sleeping and unable to receive the SM or other data.

DETAILED DESCRIPTION OF THE PREFERRED EMBODIMENTS

Figure 1:
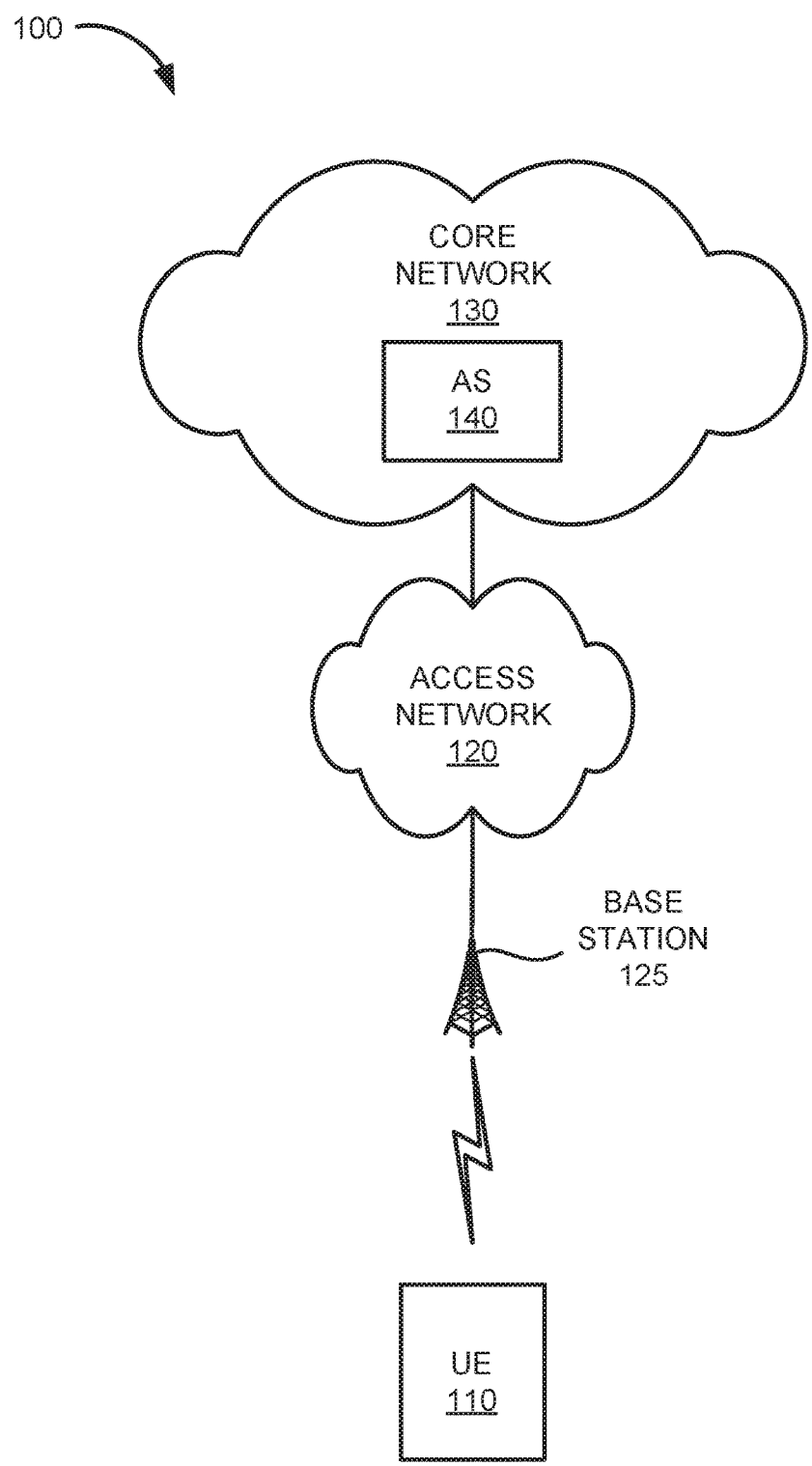
FIG. 1 is a diagram illustrating an environment according to an implementation described herein.

The following detailed description refers to the accompanying drawings. The same reference numbers in different drawings may identify the same or similar elements.

Extended Discontinuous Reception (eDRX) allows user equipment (UE) to tell a mobile network how long (e.g., how many "hyper frame" intervals of 10.24 seconds) the UE plans to sleep before checking back in with the network. The maximum interval a UE can sleep may be configured by the mobile network operator. A maximum eDRX interval may be, for example, twenty-four hours.

Power saving mode (PSM) refers to user equipment (UE) status that can minimize and reduce the energy consumption lower than normal idle mode energy consumption. PSM is widely applicable for variety of MTC devices. PSM is similar to power-off, but the UE remains registered with the network and there is no need to re-attach or re-establish PDN connections. A UE in PSM may not be immediately reachable for mobile terminating services. A UE using PSM is only available for mobile terminating services during the time it is in transmit mode and for the period of an active time (about 5 seconds) that follows the transmit mode. The transmit mode is caused by a mobile-originated event, such as an initial attach, data transfer or TAU (tracking area update) request.

In contrast with eDRX, the UE device in PSM (sometimes referred to as a "PSM UE") remains asleep (or dormant) indefinitely. The wake-up schedule for a PSM UE is determined by the TAU timer if the UE does not need to send originating data before TAU timer expiration. Normally a PSM UE's TAU timer is determined and requested by the UE device, but the service network can override a PSM UE's requested TAU timer. A drawback for the service network to override the PSM UE's TAU timer is that the override TAU timer is fixed and not flexible. Accordingly, a PSM UE's TAU timer can be either flexibly requested by UE, or rigidly enforced by the network. There is no way an application server (AS) can request a special wake-up time/schedule for a PSM UE. However, there are common instances where the need for an AS to request a special wake-up time for data services would be beneficial. For example, a PSM UE (e.g., an MTC device) may need to wake up for a special software update, a PSM UE may need to wake up for a remote maintenance/diagnosis, or a PSM UE (e.g., a metering device) may need an unscheduled reading due to an unscheduled event, such as e.g., an owner moving, etc.

Short message service (SMS) over non-access stratum (NAS) may be implemented using SMS inter-working function (SMS-IWF) devices. An SMS-IWF device may interface a wireless access network with a short message switching center (SMSC). For example, an application server (AS) may send an SMS message (or simply "SM") for a UE device to the SMSC and the SMSC may identify an SMS- IWF device associated with the UE device. The SMS-IWF device may identify a mobility management entity (MME) associated with the UE device and may forward the SM to the identified MME. The MME may then send the SM to the UE device using NAS signaling.

Since the MME is the only network element in the wireless core network that knows when a UE should wake up from eDRX and/or PSM, the MME is in a best position to support SM buffering. On the other hand, if the MME is the only network element responsible for SM buffering for an eDRX/PSM UE, the MME's overall performance and capacity may be negatively impacted. Further, SM delivery retransmission timing for all other non-eDRX/PSM UEs may be impacted by MME buffering.

According to an implementation described herein, an MME supports flexible SM buffering for eDRX/PSM UEs based on configurable criteria for how soon the eDRX/PSM UE will wake up (e.g., exit PSM or eDRX mode) and how large is the size of the SM to be sent. If the eDRX/PSM UE will wake up soon (e.g., within a small time window) or the SM size is very small, the MME will buffer the SM until the eDRX/PSM UE wakes up. Otherwise, the MME will either indicate to the SMSC when to retransmit, or treat the SM as a normal "UE unreachable" case.

According to another implementations described herein, an AS may request a special wake up time/schedule for a PSM UE. The systems and methods described herein enable an MME to initiate a one-time wake-up of a PSM UE at a non-regular time by a network enhancement that does not require any corresponding changes on the UE client or application side. Thus, once the network supports the special wake-up time requests, any type of PSM UE may be awakened at a special time by an AS, provided that the PSM UE remains compliant with current 3GPP standards.

FIG. 1 is a diagram of an exemplary environment 100 in which the systems and/or methods, described herein, may be implemented. As shown in FIG. 1, environment 100 may include an UE device 110, an access network 120, and a core network 130.

UE device 110 (also referred to herein as "wireless device") may include an Internet of Things (IoT) computer device enabled with wireless communication functionality and employing machine-to-machine (M2M) communication. UE device 110 may be configured to use eDRX and/or PSM. In some implementations, the M2M communication may include Machine-Type Communication (MTC), a type of M2M communication standard developed by 3GPP. In other implementations, the M2M communication may include a different type of communication not tied to a particular standard. For example, UE device 110 may include an embedded wireless MTC device that communicates wirelessly with other devices over an M2M interface, such as a microcontroller controlling one or more actuators, a microcontroller controlling one or more sensors, a microcontroller that performs data processing, and/or another type of electronic device with a microcontroller. Examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, etc.), a device controlling a financial transaction system (e.g., a point-of-sale terminal, a vending machine, etc.), and/or another type of electronic device. An MTC device may correspond to a stationary low data rate MTC device (e.g., parking meter), a stationary high data rate MTC device (e.g., a camera providing a video feed), an MTC device moving at pedestrian speeds (e.g., a health monitoring device attached to a user), and MTC device moving at vehicular speed (e.g., a vehicle telematics device), and/or another type of MTC device.

In other implementations, UE device 110 may include a non-IoT/M2M wireless device that employs eDRX and/or PSM. For example, UE device 110 may include a handheld wireless communication device (e.g., a mobile phone, a smart phone, a phablet device, etc.); a wearable computer device (e.g., a head-mounted display computer device, a head-mounted camera device, a wristwatch computer device, etc.), a global positioning system (GPS) device; a laptop computer, a tablet computer, or another type of portable computer; a media playing device; a portable gaming system; and/or any other type of computer device with wireless communication capabilities and a user interface.

Access network 120 may provide access to core network 130 for wireless devices, such as UE device 110. Access network 120 may enable UE device 110 to connect to core network 130 for mobile telephone service, Short Message Service (SMS) message service, Multimedia Message Service (MMS) message service, Internet access, cloud computing, and/or other types of data services.

Access network 120 may establish a packet data network (PDN) connection between UE device 110 and core network 130 via one or more Access Point Names (APNs). In some implementations, access network 120 may include a Long Term Evolution (LTE) access network (e.g., an evolved packet core (EPC) network) based on the LTE standard specified by 3GPP. In other implementations, access network 120 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

In other implementations, access network 120 may include an LTE Advanced (LTE-A) access network and/or any other advanced network, such as a 5G access network that includes functionality such as carrier aggregation; advanced or massive multiple-input and multiple-output (MIMO) configurations; cooperative MIMO (CO-MIMO); relay stations; heterogeneous networks of overlapping small cells and macrocells; Self-Organizing Network (SON) functionality; MTC functionality, such as 1.4 MHz wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Access network 120 may include a base station 125, and UE device 110 may wirelessly communicate with access network 120 via base station 125 when UE device 110 is located within the geographic area serviced by base station 125. Base station 125 may be part of an LTE eNodeB base station device. An eNodeB base station device may use the Evolved Universal Terrestrial Radio Access (E-UTRA) air interface to wirelessly communicate with devices. An eNodeB base station device may include one or more devices (e.g., base stations 125) and other components and functionality that allow UE device 110 to wirelessly connect to access network 120. The eNodeB base station device may include or be associated with one or more cells. For example, each cell may include an RF transceiver facing a particular direction. The eNodeB base station device may correspond to a macrocell or to a small cell (e.g., a femtocell, a picocell, a microcell, etc.).

Core network 130 may include a local area network (LAN), a wide area network (WAN), a metropolitan area network (MAN), an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 130 may allow the delivery of Internet Protocol (IP) services to UE device 110, and may interface with other external networks. Core network 130 may include one or more server devices and/or network devices, or other types of computation or communication devices. In some implementations, core network 140 may include an Internet Protocol Multimedia Sub-system (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

According to an implementation, core network 130 may include an application server (AS) device 140. AS device 140 (referred to hereafter simply as "AS 140") may include one or more devices, such as computer devices and/or server devices, which are configured to communicate with UE device 110. AS 140 may solicit, receive, and process MTC data from UE 110. As described further herein, AS 140 may initiate a mobile terminated (MT) SM to UE 110 and initiate special wake-up time requests for UE device 110. In other implementations, AS 140 may be located outside of core network 130. For example, AS 140 may be located inside a private network (not shown in FIG. 1) that is connected to core network 130.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100.

Figure 2:
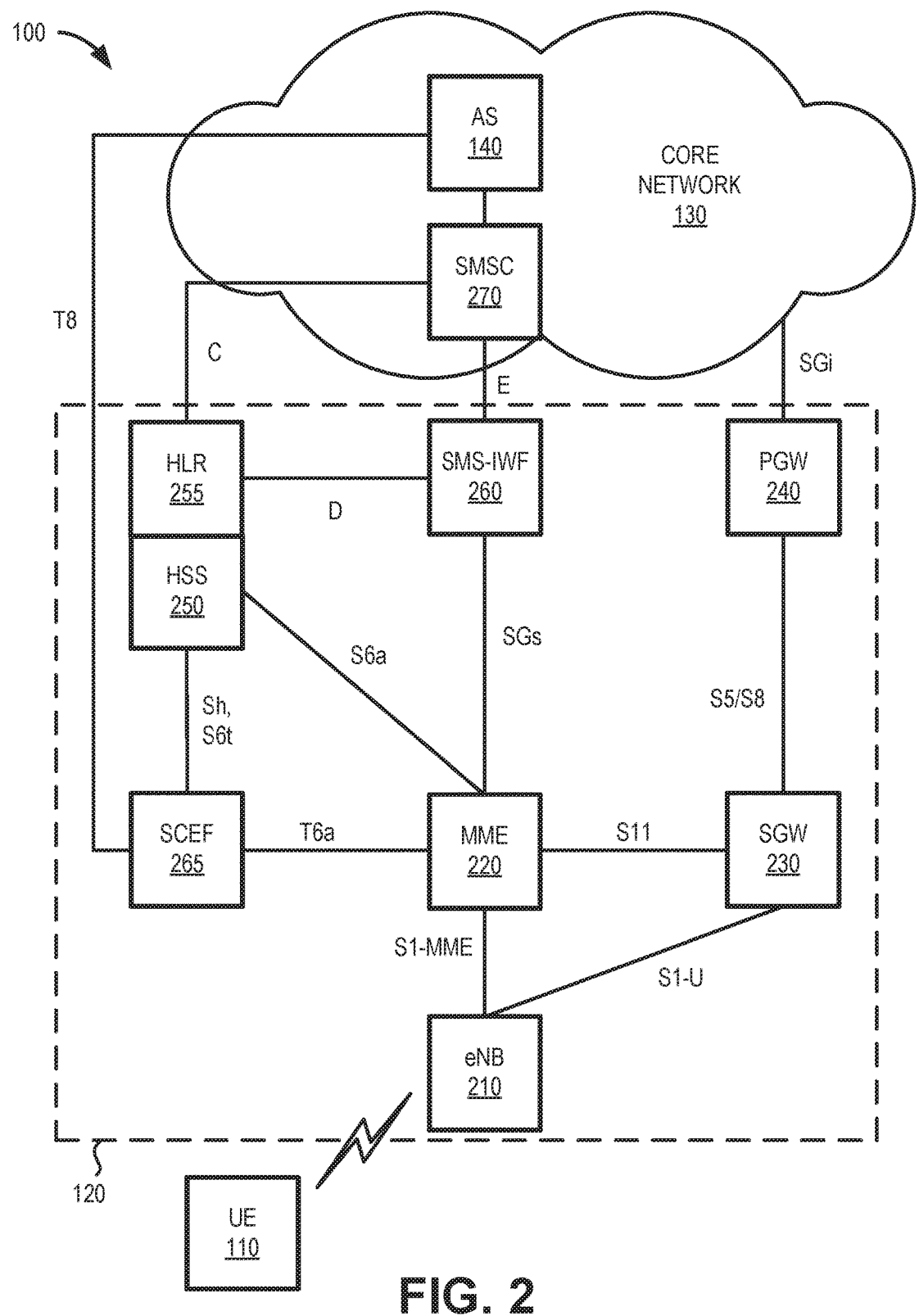
FIG. 2 is a diagram illustrating exemplary components of the access network within the environment of FIG. 1.

FIG. 2 is a diagram illustrating exemplary components of the access network 120 and other components within environment 100 according to an implementation described herein. As shown in FIG. 2, access network 120 may correspond to an LTE access network and may include devices that implement logical entities interconnected via standardized interfaces, and that provide wireless packet-switched services and wireless IP connectivity to user devices for both data and voice services. Access network 120 may include an eNodeB 210 (corresponding to base station 125), an MME device 220, a serving gateway (SGW) 230, a packet data network gateway (PGW) 240, a home subscriber server (HSS) device 250, a home location register (HLR) device 255, an SMS-IWF device 260, and a service capability exposure function (SCEF) device 265.

One or more devices in access network 120 may interface with AS 140 and/or a SMSC 270. While FIG. 2 shows AS 140 located within core network 130, in other implementations, AS 140 may be located outside core network 130. For example, AS 140 may be located in a private network or an IMS network. While FIG. 2 depicts a single AS 140, eNodeB 210, MME device 220, SGW 230, PGW 240, HSS device 250, HLR device 255, SMS-IWF device 260, and an SMSC device 270 for illustration purposes, in practice, environment 100 may include multiple AS 140, eNodeBs 210, MME devices 220, SGWs 230, PGWs 240, HSSs devices 250, SMS-IWF devices 260, and/or SMSC devices 270.

eNodeB 210 may include one or more devices (e.g., base stations) and other components and functionality that allow UE device 110 to wirelessly connect to access network 120 (e.g., base station 125). eNodeB 210 may include or be associated with one or more cells. For example, each cell may include a radio frequency (RF) transceiver facing a particular direction. eNodeB 210 may interface with access network 120 via an interface referred to as an S1 interface, which may be split into a control plane S1-MME interface and a data plane S1-U interface. The S1-MME interface may interface with MME 220. The S1-MME interface may be implemented, for example, with a protocol stack that includes a Network Access Server protocol and/or Stream Control Transmission Protocol (SCTP). The S1-U interface may interface with SGW 230 and may be implemented, for example, using GTPv2.

MME device 220 (referred to hereafter simply as "MME 220") may implement control plane processing for access network 120. For example, MME 220 may implement tracking and paging procedures for UE device 110, may activate and deactivate bearers for UE device 110, may authenticate a user of UE device 110, and may interface to non-LTE radio access networks. A bearer may represent a logical channel with particular quality of service (QoS) requirements. MME 220 may also select a particular SGW 230 for a particular UE device 110. A particular MME 220 may interface with other MMEs 220 (not shown) in access network 120 and may send and receive information associated with UE devices 110, which may allow one MME 220 to take over control plane processing of UE devices serviced by another MME 220, if the other MME 220 becomes unavailable.

According to an implementation described further herein, MME 220 may manage special wake-up time requests from AS 140 to a UE device 110 serviced by MME 220. According to another implementation described further herein, MME 220 uses flexible buffering of SMs originating from AS 140 when a UE device 110 serviced by MME 220 is sleeping (e.g., in eDRX or PSM mode).

SGW 230 may provide an access point to and from UE device 110, may handle forwarding of data packets for UE device 110, and may act as a local anchor point during handover procedures between eNodeBs 210. SGW 230 may interface with PGW 240 through an S5/S8 interface. The S5/S8 interface may be implemented, for example, using GTPv2. MME 220 may communicate with SGW 230 through an S11 interface. The S11 interface may be implemented, for example, using GTPv2. The S11 interface may be used to create and manage a new session for a particular UE device 110.

PGW 240 may function as a gateway to an IMS network (and/or any other network associated with core network 130) through an SGi interface. A particular UE device 110, while connected to a single SGW 230, may be connected to multiple PGWs 240, one for each packet network with which UE device 110 communicates.

HSS device 250 (referred to hereafter simply as "HSS 250") may store information associated with UE devices 210 and/or information associated with users of UE devices 210. For example, HSS 250 may store subscription profiles that include authentication and access authorization information. Each subscription profile may include a list of UE devices 210 associated with the subscription as well as an indication of which UE device 110 is authorized to connect to access network 120 and to core network 130. MME 220 may communicate with HSS 250 through an S6a interface. The S6a interface 252 may be implemented, for example, using a Diameter protocol.

HLR device 255 (referred to hereafter simply as "HLR 255") may store subscriber information relating to SMs. For example, HLR 255 may obtain information identifying which UE devices 110 are associated with SMS-IWF device 260 from SMS-IWF device 260 via a D interface (e.g., SS7 Mobile Application Protocol (MAP)-D). Furthermore, HLR 255 may provide information identifying which SMS-IWF device 260 is associated with a particular UE device 110 to SMSC 270 via a C interface (e.g., SS7 MAP-C).

SMS-IWF device 260 (referred to hereafter simply as "SMS-IWF 260") may interface access network 120 with SMSC 270. For example, each SMS-IWF 260 may be assigned a subset of the UE devices 110 associated with MME 220. In one implementation, SMS-IWF 260 may perform some functions similar to or equivalent to a visitor location register (VLR). SMS-IWF 260 may receive a SM from SMSC 270 and may provide the SM to MME 220. Moreover, SMS-IWF 260 may receive an SM from MME 220 and may provide the SM to SMSC 270. SMS-IWF 260 may communicate with SMSC 270 via an E interface (e.g., SS7 MAP-E). SMS-IWF 260 may communicate with MME 220 over a link implemented as an SGs interface. The SGs interface may be implemented, for example, using SGs Application Part (SGsAP) protocol and/or SCTP.

SCEF device 265 (referred to hereafter simply as "SCEF 265") may include a network or computational device that provides the capability for the creation, verification, and testing of MTC services. In one implementation, SCEF 265 may exchange control plane signaling with MME 220 (via a T6a interface using Diameter protocol) and/or HSS 250 (via an Sh or S6t interface). In one implementation, SCEF 265 may be included as part of a control plane bearer path between UE device 110 and AS 140. According to an implementation described herein, SCEF 265 acts as a gateway for connecting UE device 110 to AS 140. Generally, SCEF 265 may expose APIs for multiple application servers (such as AS 140) to access network services to communicate with UE devices 110. UE device 110 sets up a non-IP PDN connection towards SCEF 265, and SCEF 265 will have connectivity towards AS 140, as shown in FIG. 2. In this way, SCEF 265 may facilitate communication between UE device 110 and AS 140.

As described further herein, SCEF 265 may communicate with AS 140 via a modified T8 interface. In one implementation, the modified T8 interface may be incorporated as a new standardized interface (e.g., defined in 3GPP standards). The modified T8 interface supports special wake-up time requests from AS 140 and responses forwarded from SCEF 265. More particularly, AS 140 may provide a special wake-up time request, with an AS-designated wake-up time for UE device 110, to SCEF 265 via the T8 interface. The AS-designated wake-up time may be different than the network-default TAU interval. Also, as described further herein, SCEF 265 may communicate with MME 220 via a modified T6a interface. In one implementation, the modified T6a interface may be incorporated as a new standardized interface (e.g., defined in 3GPP standards). The modified T6a interface may support configuration-information-requests (CIR) and configuration-information-answers (CIA) for special wake-up time requests. For example, the CIR is enhanced to allow SCEF 265 to request a special wake-up time from MME 220. Also, the CIA is enhanced to allow MME 220 to indicate to SCEF 265 one or more of the following: a special wake-up time request is accepted, a special wake-up time request cannot be fulfilled, a UE device 110 is currently awake and until when, and/or when UE device 110 will wake up and for how long.

SMSC device 270 (referred to hereafter simply as "SMSC 270") may receive an SM from AS 140 and may route or switch the SM to UE device 110 via SMS-IWF device 260 if UE device 110 is the intended recipient of the SM. Moreover, SMSC 270 may receive an SM from UE device 110 via SMS-IWF device 260 and may route or switch the SM to AS 140 if AS 140 is the intended recipient of the SM. In some implementations, SMSC 270 may be located in core network 130. In other implementations, SMSC 270 may be located in access network 120. As described further herein, SMSC 270 may buffer MT SM data for a UE device 110 that is sleeping.

Although FIG. 2 shows exemplary components of access network 120, in other implementations, access network 120 may include fewer components, different components, differently arranged components, or additional components than depicted in FIG. 2. Additionally or alternatively, one or more components of access network 120 may perform functions described as being performed by one or more other components of access network 120.

Figure 3:
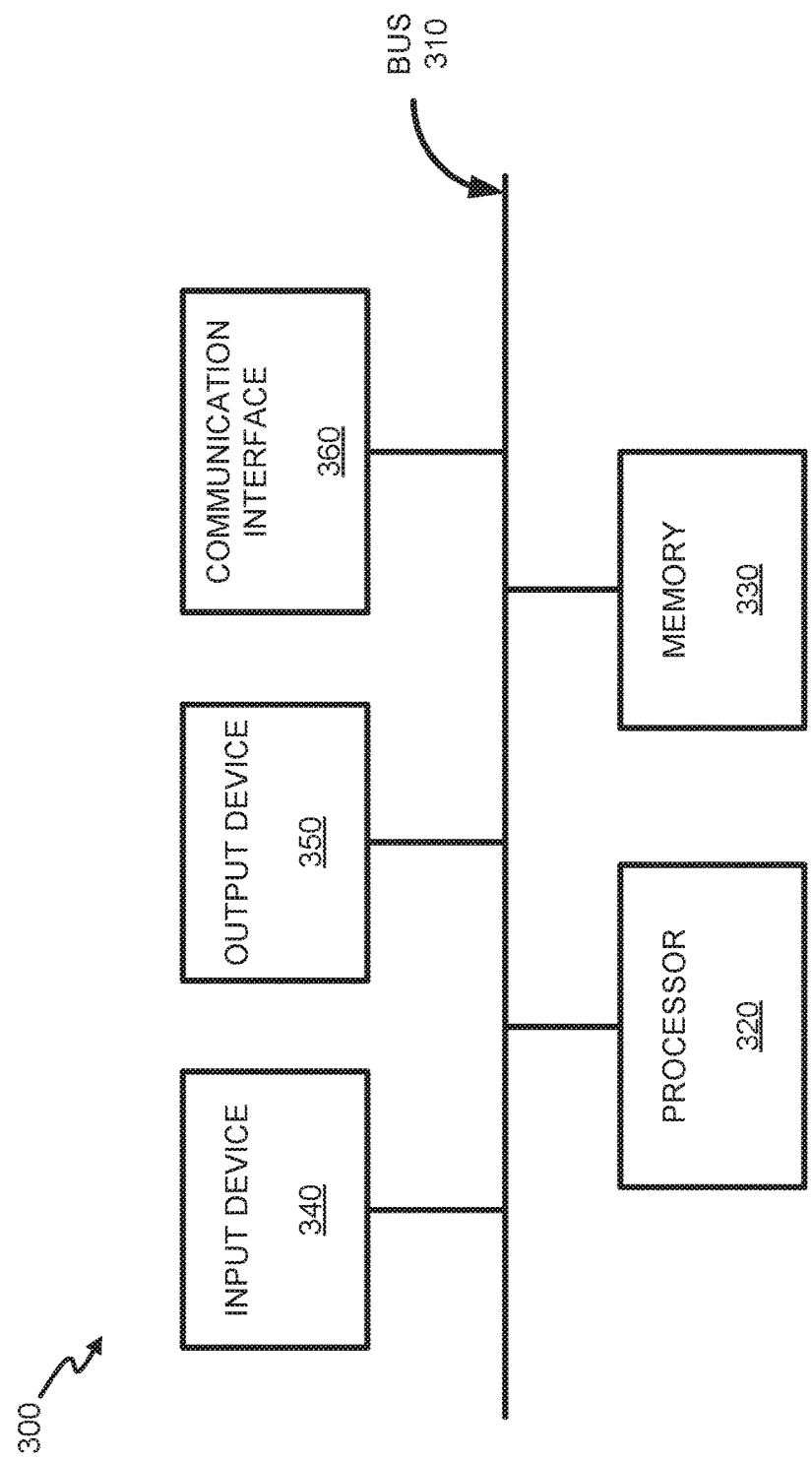
FIG. 3 is a diagram illustrating exemplary logical components of a device that may be included in a device of FIG. 2.

FIG. 3 is a diagram illustrating example components of a device 300 according to an implementation described herein. UE device 110, AS 140, eNodeB 210, MME 220, SGW 230, PGW 240, HSS 250, HLR 255, SMS-IWF device 260, SCEF 265, and/or SMSC 270 may each include one or more devices 300. As shown in FIG. 3, device 300 may include a bus 310, a processor 320, a memory 330, an input device 340, an output device 350, and a communication interface 360.

Bus 310 may include a path that permits communication among the components of device 300. Processor 320 may include any type of single-core processor, multi-core processor, microprocessor, latch-based processor, and/or processing logic (or families of processors, microprocessors, and/or processing logics) that interprets and executes instructions. In other embodiments, processor 320 may include an application-specific integrated circuit (ASIC), a field-programmable gate array (FPGA), and/or another type of integrated circuit or processing logic.

Memory 330 may include any type of dynamic storage device that may store information and/or instructions, for execution by processor 320, and/or any type of non-volatile storage device that may store information for use by processor 320. For example, memory 330 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 340 may allow an operator to input information into device 300. Input device 340 may include, for example, a keyboard, a mouse, a pen, a microphone, a remote control, an audio capture device, an image and/or video capture device, a touch-screen display, and/or another type of input device. In some embodiments, device 300 may be managed remotely and may not include input device 340. In other words, device 300 may be "headless" and may not include a keyboard, for example.

Output device 350 may output information to an operator of device 300. Output device 350 may include a display, a printer, a speaker, and/or another type of output device. For example, device 300 may include a display, which may include a liquid-crystal display (LCD) for displaying content to the customer. In some embodiments, device 300 may be managed remotely and may not include output device 350. In other words, device 300 may be "headless" and may not include a display, for example.

Communication interface 360 may include a transceiver that enables device 300 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 360 may include a transmitter that converts baseband signals to radio frequency (RF) signals and/or a receiver that converts RF signals to baseband signals. Communication interface 360 may be coupled to an antenna for transmitting and receiving RF signals.

Communication interface 360 may include a logical component that includes input and/or output ports, input and/or output systems, and/or other input and output components that facilitate the transmission of data to other devices. For example, communication interface 360 may include a network interface card (e.g., Ethernet card) for wired communications and/or a wireless network interface (e.g., a Wi-Fi) card for wireless communications. Communication interface 360 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 300 may perform certain operations relating to management of special wake-up times for UE devices 110 and/or buffering of short messages to UE devices 110. Device 300 may perform these operations in response to processor 320 executing software instructions contained in a computer-readable medium, such as memory 330. A computer-readable medium may be defined as a non-transitory memory device. A memory device may be implemented within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of, or in combination with, software instructions to implement processes described herein. Thus, implementations described herein are not limited to any specific combination of hardware circuitry and software.

Although FIG. 3 shows exemplary components of device 300, in other implementations, device 300 may include fewer components, different components, additional components, or differently arranged components than depicted in FIG. 3. Additionally or alternatively, one or more components of device 300 may perform one or more tasks described as being performed by one or more other components of device 300.

Figure 4:
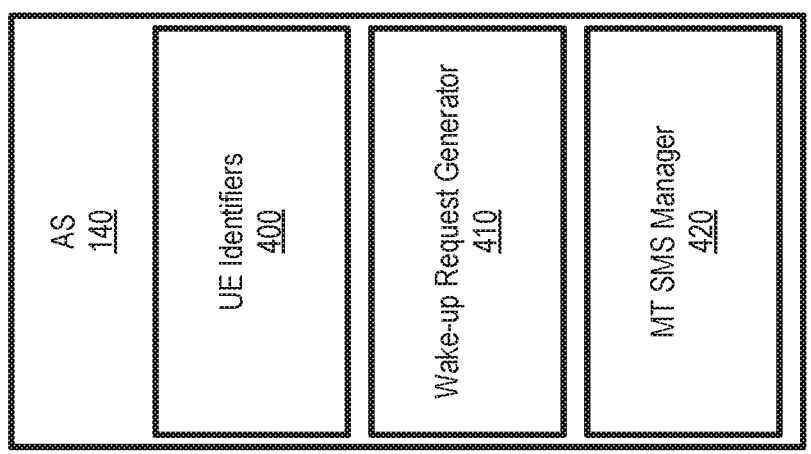
FIG. 4 is a block diagram illustrating exemplary logical components of an application server (AS) device of FIG. 2.

FIG. 4 is a block diagram illustrating exemplary logical components of AS 140. The functions described in connection with FIG. 4 may be performed by one or more components of device 300 (FIG. 3). Some or all of the logical blocks of FIG. 4 may be included, for example, in an application (e.g., software), stored in memory 330 and executed by processor 320. As shown in FIG. 4, AS 140 may include UE identifiers 400, a wake-up request generator 410, and an MT SMS manager 420. Other configurations may be implemented. Therefore, AS 140 may include additional, fewer and/or different logical components than those depicted in FIG. 4.

UE identifiers 400 may include a unique device identifier for each UE device 110 registered with access network 120. Unique device identifiers for each UE device 110 may include a Mobile Station International Subscriber Directory Number (MSISDN), an International Mobile Subscriber Identity (IMSI), an external identifier, etc. for each UE device 110. An external identifier may correspond, for example, to a unique identifier that AS 140 uses for UE device 110 in special wake-up time requests, as described further herein. UE identifiers 400 may be stored in a database, memory (e.g., memory 230), or another storage medium of AS 140 or accessible by AS 140.

Wake-up request generator 410 may create and send a special wake-up request to SCEF 265 via the T8 interface. For example, an operator or automated management system associated with AS 140 may identify a need to initiate a PSM wake-up for a particular UE device 110. Wake-up request generator 410 may be directed to generate a wake-up time request including, for example, a unique device identifier for UE device 110 and a desired wake-up time window. In one implementation, wake-up request generator 410 may provide the wake-up time requests using an API for the T8 interface.

MT SMS manager 420 may generate and send short messages to UE device 110. More particularly, MT SMS manager 420 may submit SMs to SMSC 270 for delivery to UE device 110 via SMS over NAS protocols.

Figure 5:
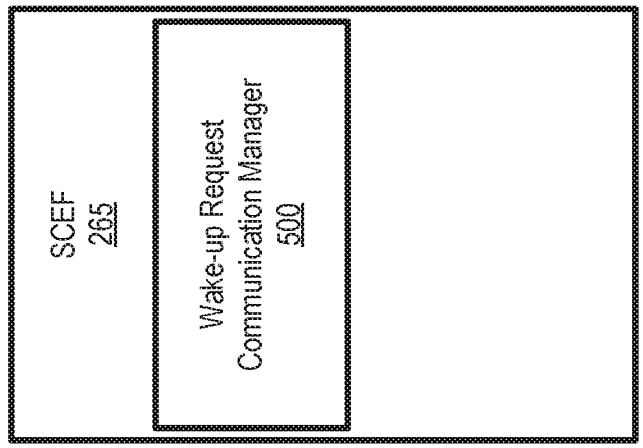
FIG. 5 is a block diagram illustrating exemplary logical components of a service capability exposure function (SCEF) device of FIG. 2.

FIG. 5 is a block diagram illustrating exemplary logical components of SCEF 265. The functions described in connection with FIG. 5 may be performed by one or more components of device 300 (FIG. 3). Some or all of the logical blocks of FIG. 5 may be included, for example, in an application (e.g., software), stored in memory 330 and executed by processor 320. As shown in FIG. 5, SCEF 265 may include a wake-up request communications manager 500. Other configurations may be implemented. Therefore, SCEF 265 may include additional and/or different logical components than those depicted in FIG. 5.

Wake-up request communications manager 500 may receive wake-up time requests from AS 140 and forward the wake-up time requests to MME 220. Wake-up request communications manager 500 may also receive wake-up time request responses from MME 220 and forward the wake-up time request responses to AS 140. In one implementation, when SCEF 265 receives a wake-up time request, SCEF 265 will send a user-data-request (UDR) to HSS 250 (e.g., via the Sh interface) to determine the identity of a serving MME 220 for UE device 110. SCEF 265 may then send a configuration-information-request (CIR) to the identified MME 220 to request a special wake-up time for UE device 110. Wake-up request communications manager 500 may receive wake-up time request responses from MME 220 and forward the responses back to AS 140 via the T8 interface.

Figures 6A, 6B:
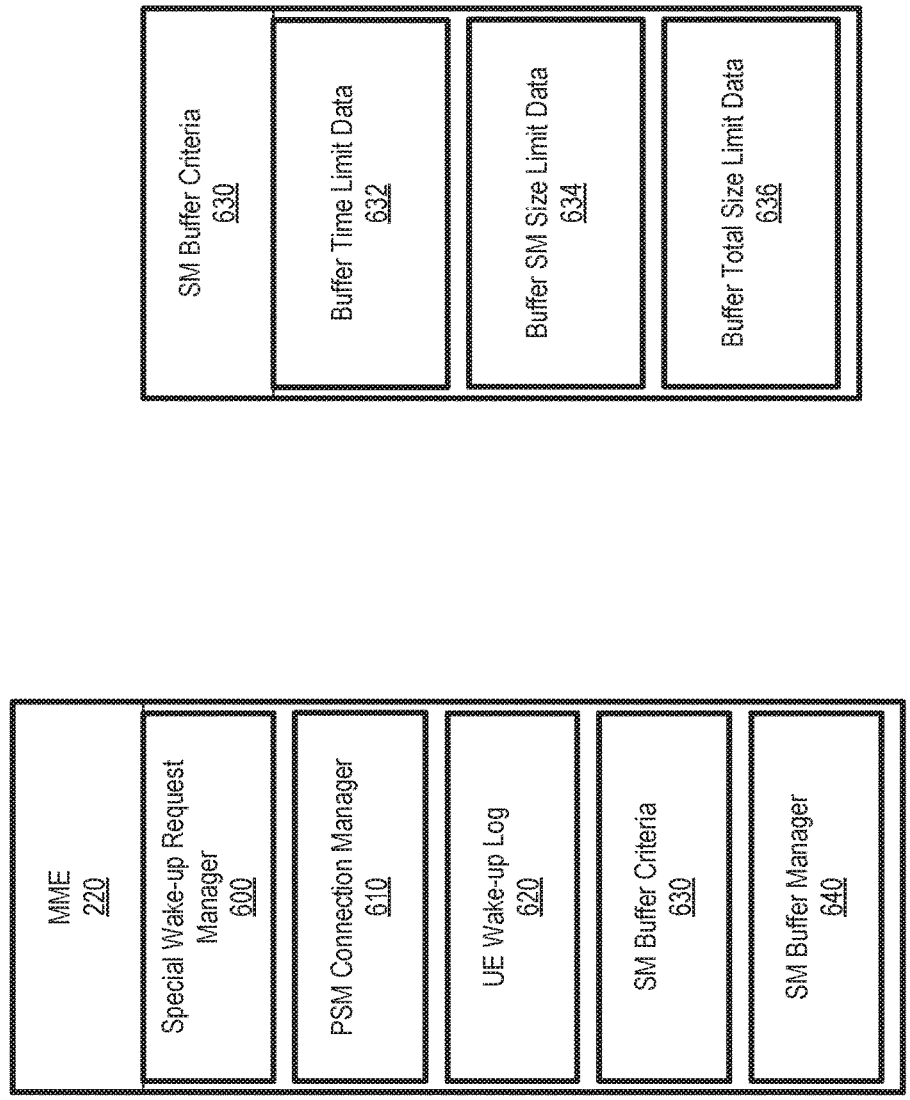
FIG. 6A is a block diagram illustrating exemplary logical components of a mobility management entity (MME) device of FIG. 2.
FIG. 6B is a block diagram illustrating exemplary logical components of the short message (SM) buffer criteria of FIG. 6A.

FIG. 6A is a block diagram illustrating exemplary logical components of MME 220. The functions described in connection with FIG. 6A may be performed by one or more components of device 300 (FIG. 3). Some or all of the logical blocks of FIG. 6A may be included, for example, in an application (e.g., software), stored in memory 330 and executed by processor 320. As shown in FIG. 6A, MME 220 may include a special wake-up time request manager 600, a PSM connection manager 610, a UE wake-up log 620, SM buffer criteria 630, and SM buffer manager 640. Other configurations may be implemented. Therefore, MME 220 may include additional and/or different logical components than those depicted in FIG. 6A.

Wake-up request manager 600 may receive and process forwarded wake-up time requests from SCEF 265. When MME 220 receives a wake-up time request, special wake-up time request manager 600 may check the current PSM time windows of the UE device 110 identified in the wake-up time request and determine whether the wake-up time request can be granted. If special wake-up time request manager 600 determines UE device 110 is currently in an active mode/awake, MME 220 will respond to SCEF 265 and indicate UE device 110 is currently awake and the wake-up time window based on the active timer. If special wake-up time request manager 600 determines that UE device 110 is asleep and not scheduled to wake up before the special wake-up time indicated in the wake-up time request, MME 220 will respond to SCEF 265 to deny the wake-up time request. If special wake-up time request manager 600 determines that the UE device 110 is asleep and is scheduled to wake up before the special wake-up time indicated in the wake-up time request, MME 220 will respond to SCEF 265 to grant the wake-up time request.

PSM connection manager 610 stores a special wake-up time, associated with a particular UE device 110, for accepted wake-up time requests. In one implementation, PSM connection manager 610 may store special wake-up times in UE wake-up log 620. When UE device 110 wakes up (e.g., at a scheduled TAU interval) and submits a TAU request, PSM connection manager 610 may provide a TAU response with the special wake-up time that UE device 110 may implement. In one implementation, PSM connection manager 610 may store the special wake-up time and provide the special wake-up time to UE device 110 only in response to a TAU request that immediately precedes the special wake-up time.

UE wake-up log 620 may store wake-up times, associated with particular UE devices 110, for UE devices using eDRX or PSM. UE wake-up log 620 may include special wake-up times for UE devices indicated in wake-up time requests from SCEF 265. UE wake-up log 620 may also store/calculate wake-up times based on, for example, network TAU intervals for each UE device 110.

SM buffer criteria 630 includes configurable criteria for flexible buffering of SMs directed from AS 140 to UE device 110. In one implementation, SM buffer criteria 630 may be applied to individual MMEs 220, such that SM buffer criteria 630 may be different from one MME 220 to another MME 220. SM buffer criteria 630 are described further in connection with FIG. 6B. As shown in FIG. 6B, SM buffer criteria 630 may include buffer time limit data 632, buffer SM size limit data 634, and buffer total size limit data 636.

Buffer time limit data 632 may include a global configurable SM buffering timer data that identifies a short timer window that MME 220 can buffer a SM. For example, buffer time limit data 632 may be configured to indicate a window of 60 seconds. If a scheduled wake-up time for UE device 110 is less than 60 seconds from the time MME 220 receives a MT SMS paging request for UE 110, the corresponding SM may be eligible for buffering.

Buffer SM size limit data 634 may include a global configurable individual SM size data that identifies the maximum individual SM size allowed to be buffered by MME 220. For example, buffer size limit data 634 may be configured to indicate a size of 50 bytes. If an SM size (e.g., as indicated in a MT SMS paging request from SMS-IWF 260) is no more than 50 bytes, the corresponding SM may be eligible for buffering.

Buffer total size limit data 636 may include a global configurable maximum total size of SM data that indicates the total data size allowed to be buffered at MME 220 for all SMs. For example, buffer total size limit data 636 may be configured to indicate a maximum size of two gigabytes. If an SM size (e.g., as indicated in a MT SMS paging request from SMS-IWF 260) does not cause the buffer total size limit for all SMs to be exceeded, the corresponding SM may be eligible for buffering.

Returning to FIG. 6A, SM buffer manager 640 may determine whether local buffering of SMs originating from AS 140 is necessary and/or feasible. SM buffer manager 640 may receive MT SMS paging requests from SMS-IWF 260 and extract an SM size parameter. SM buffer manager 640 may check with UE wake-up log 620 to determine if the UE device 110 indicated in the paging request is currently sleeping (e.g., preventing normal SM delivery). If UE device 110 is sleeping, SM buffer manager 640 may compare data from the paging request with SM buffer criteria 630 to determine if buffering by ME 220 is possible. If all criteria/conditions of SM buffer criteria 630 are satisfied, MME 220 can proceed as if UE device 110 is reachable for paging and request the SM data from SMS-IWF 260. MME 220 will buffer the received SM, page UE device 110 when UE device 110 becomes reachable, and then deliver the SM.

In one implementation, SM buffer manager 640 may strictly apply SM buffer criteria 630. For example, if UE device 110 is currently sleeping, MME 220 shall check (1) if UE device 110 will wake up from eDRX/PSM within the short time window specified buffer time limit data 632, (2) the SM size to be delivered is within the SM size specified in buffer SM size limit data 634, and the total size of SMs MME 220 has already buffered plus the to-be-delivered SM size is within the maximum total SMs size specified in buffer total size limit data 636. If all three criteria/conditions are satisfied, the MME 220 may buffer the incoming SM.

In another implementation, SM buffer manager 640 may support further flexible controls for SM buffering based on buffering criteria 630. For example, if (1) the SM size to be delivered is up to $X_1$% larger than the individual allowed SM size as specified in buffer SM size limit data 634, (2) UE device 110 will wake up at least $X_2$% earlier than the short time window as specified in buffer time limit data 632, and (3) the current usage of total buffered SMs size is $X_3$% less than the maximum allowed total size for all SMs specified in buffer total size limit data 636, then MME 220 can still allow the SM buffering. $X_1$, $X_2$ and $X_3$ may be configurable and can be configured with a same value or different values.

As another example of flexible controls used by SM buffer manager 640, if (1) UE device 110 will wake-up up to $Y_1$% later than the short time window specified in buffer time limit data 632, (1) the SM size to be delivered is at least $Y_2$% smaller than the individual allowed SM size as specified in buffer SM size limit data 634, and (3) the current usage of total buffered SMs is $Y_3$% less than the maximum allowed total SMs size specified in buffer total size limit data 636, then MME 220 can still allow the SM buffering. $Y_1$, $Y_2$ and $Y_3$ can be configurable and can be configured with the same value or different values.

As still another example of flexible controls used by SM buffer manager 640, instead of checking UE wake-up time and to-be-delivered SM size first, SM buffer manager 640 may first check the current usage of total SMs already buffered. For example, if the current usage of total buffered SMs is $Z_1$% less than the maximum allowed total SMs size specified in buffer total size limit data 636, MME 220 can dynamically increase the allowed UE wake-up time window with $Z_{11}$%, and MME 220 can also increase the allowed to-be-delivered SM size with $Z_{12}$%. If the current usage of total buffered SMs is $Z_2$% less than the maximum allowed total SMs size specified in buffer total size limit data 636, MME 220 can dynamically increase the allowed UE wake-up time window with $Z_{21}$%, and MME 220 can also increase the allowed to-be-delivered SM size with $Z_{22}$%. $Z_1$, $Z_{12}$, $Z_{13}$, $Z_2$, $Z_{21}$, $Z_{23}$ can be configurable and may be expanded to $Z_3$, $Z_{31}$, $Z_{32}$ and so forth.

Figure 7:
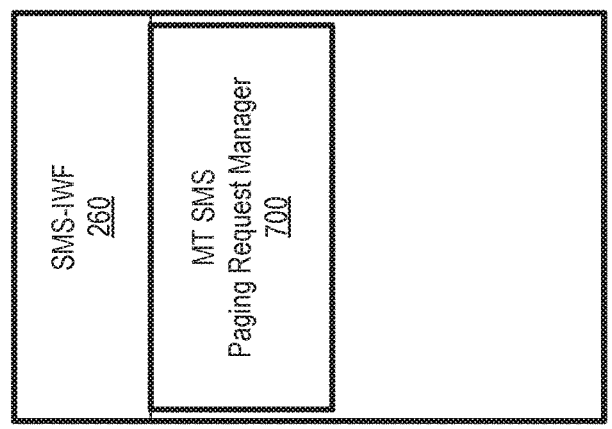
FIG. 7 is a block diagram illustrating exemplary logical components of a Short Message Service Inter-Working Function (SMS-IWF) device of FIG. 2

FIG. 7 is a block diagram illustrating exemplary logical components of SMS-IWF 260. The functions described in connection with FIG. 7 may be performed by one or more components of device 300 (FIG. 3). Some or all of the logical blocks of FIG. 7 may be included, for example, in an application (e.g., software), stored in memory 330 and executed by processor 320. As shown in FIG. 7, SMS-IWF 260 may include a MT SMS paging request manager 700. Other configurations may be implemented. Therefore, SMS-IWF 260 may include additional and/or different logical components than those depicted in FIG. 7.

MT SMS paging request manager 700 may receive SMs from SMSC 270 and determine a message size. MT SMS paging request manager 700 may also receive a maximum retransmission time for SMSC 270. Using an enhanced SGs interface that utilizes an SM size parameter, MT SMS paging request manager 700 may generate a paging request to MME 220. In one implementation, the modified SGs interface may be incorporated as a new standardized interface (e.g., defined in 3GPP standards). The paging request may include the message size and the maximum retransmission time for SMSC 270. MT SMS paging request manager 700 may receive a service request from MME to download messages the MME determines are deliverable, and, for the deliverable messages, send downlink SM data to MME 220.

Figure 8:
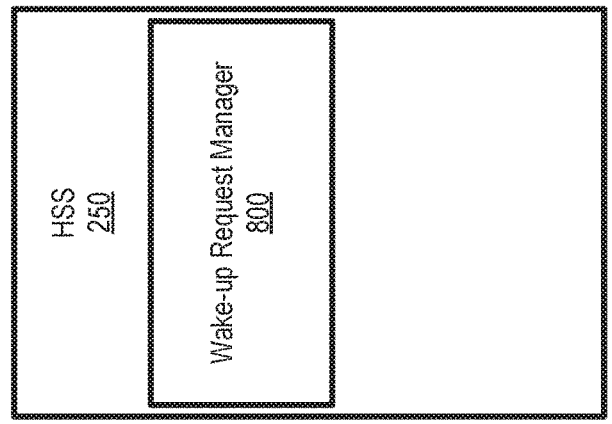
FIG. 8 is a block diagram illustrating exemplary logical components of a home subscriber server (HSS) device of FIG. 2.

FIG. 8 is a block diagram illustrating exemplary logical components of HSS 250. The functions described in connection with FIG. 8 may be performed by one or more components of device 300 (FIG. 3). Some or all of the logical blocks of FIG. 8 may be included, for example, in an application (e.g., software), stored in memory 330 and executed by processor 320. As shown in FIG. 8, HSS 250 may include a wake-up time request manager 800. Other configurations may be implemented. Therefore, HSS 250 may include additional and/or different logical components than those depicted in FIG. 8.

Wake-up time request manager 800 may be used in an alternate embodiment where SCEF 265 may send special wake-up time requests to HSS 250 via S6t interface. Since HSS 250 typically knows the serving MME 220 for UE device 110, HSS 250 may send the special wake-up time request to the serving MME 220 via an enhanced S6a interface. Responses from MME 220 may be fed back through the wake-up time request manager 800 of HSS 250 to SCEF 265.

Figure 9A:
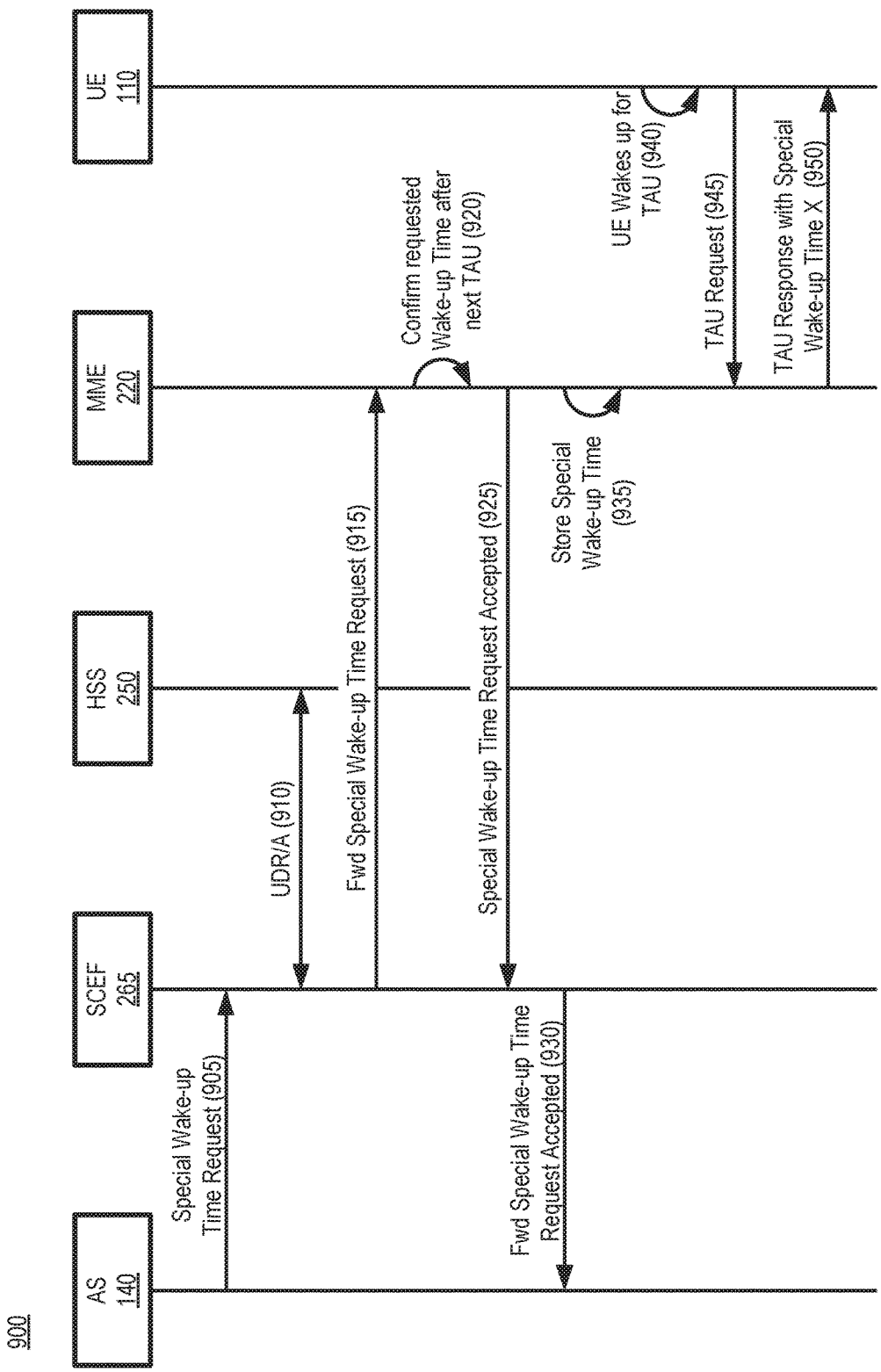
FIGS. 9A and 9B are diagrams illustrating exemplary communications for implementing a special wake-up time request in a portion of the network environment of FIG. 2.
Figure 9B:
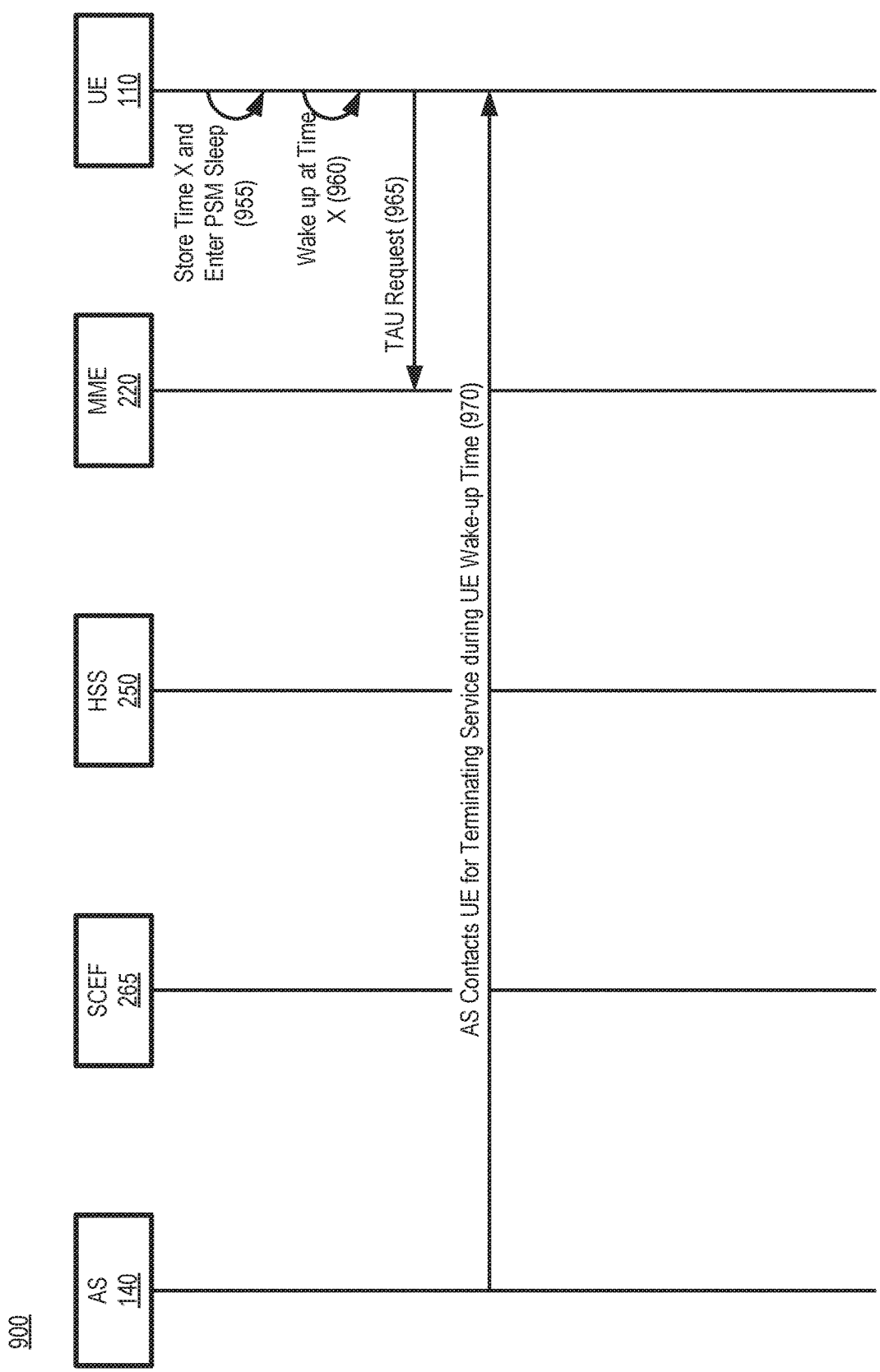

FIGS. 9A-9B are diagrams illustrating exemplary communications between devices in a portion 900 of environment 100. Communications in FIGS. 9A-9B represent communications to implement special wake-up time requests from AS 140. As shown in FIGS. 9A-9B, network portion 900 may include UE device 110, AS 140, MME 220, HSS 250, and SCEF 265. For communications in FIGS. 9A-9B, AS 140 is requesting UE device 110 to wake up at a special wake-up time "X" for machine maintenance, which is after the UE device's upcoming TAU request. Communications shown in FIGS. 9A-9B are simplified for purposes of description, with some exchanges being combined or omitted.

As shown in FIG. 9A, AS 140 may provide a special wake-up time request 905 to SCEF 265 (e.g., an API call over the T8 interface). Special wake-up time request 905 may include a device ID for UE device 110 and a requested wake-up time "X." SCEF 265 may receive special wake-up time request 905. In response, SCEF 265 may submit a UDR to HSS 250 (e.g., via the Sh interface) and receive a user-data-answer (UDA) to determine the identity of serving MME 220 for UE device 110, as indicated by reference 910.

Using the identity of serving MME 220 from the UDA, SCEF 265 may forward (e.g., a CIR over the T6a interface) the special wake-up time request 915 to MME 220. As indicated by reference 920, MME 220 may receive the forwarded special wake-up time request 915 and confirm that the requested wake-up time (e.g., "X") is after the next TAU interval for UE device 110. Once confirmed, MME 220 may send a response (e.g., a CIA over the T6a interface) to SCEF 265 that the special wake-up time request is accepted, as indicated by reference 925. SCEF 265 may receive the acceptance response and forward the acceptance response (e.g., an API response over the T8 interface) to AS 140, as indicated by reference 930. Along with accepting special wake-up time request 915, MME 220 may store the special wake-up time (e.g., "X") for UE device 110, as indicated by reference 935.

UE device 110 may wake up from PSM at the next TAU interval, as indicated by reference 940, and UE device 110 may send a TAU request 945 to MME 220. MME 220 may receive TAU request 945 and provide a TAU response 950 that includes the special wake-up time "X" for UE device 110's next wake-up interval.

Referring to FIG. 9B, UE device 110 may receive TAU response 950, store the special wake-up time "X," and then enter a PSM sleep interval, as indicated by reference 955. UE device 110 may then wake up at time "X," as indicated by reference 960. Upon wake-up, UE device 110 may submit at TAU request 965 to MME 220. AS 140 (e.g., based on information from acceptance response 930) may contact UE device 110 for terminating services (e.g., machine maintenance, in this instance) during the wake-up interval of UE device 110 starting at time X, as indicated by reference 970.

Figure 10:
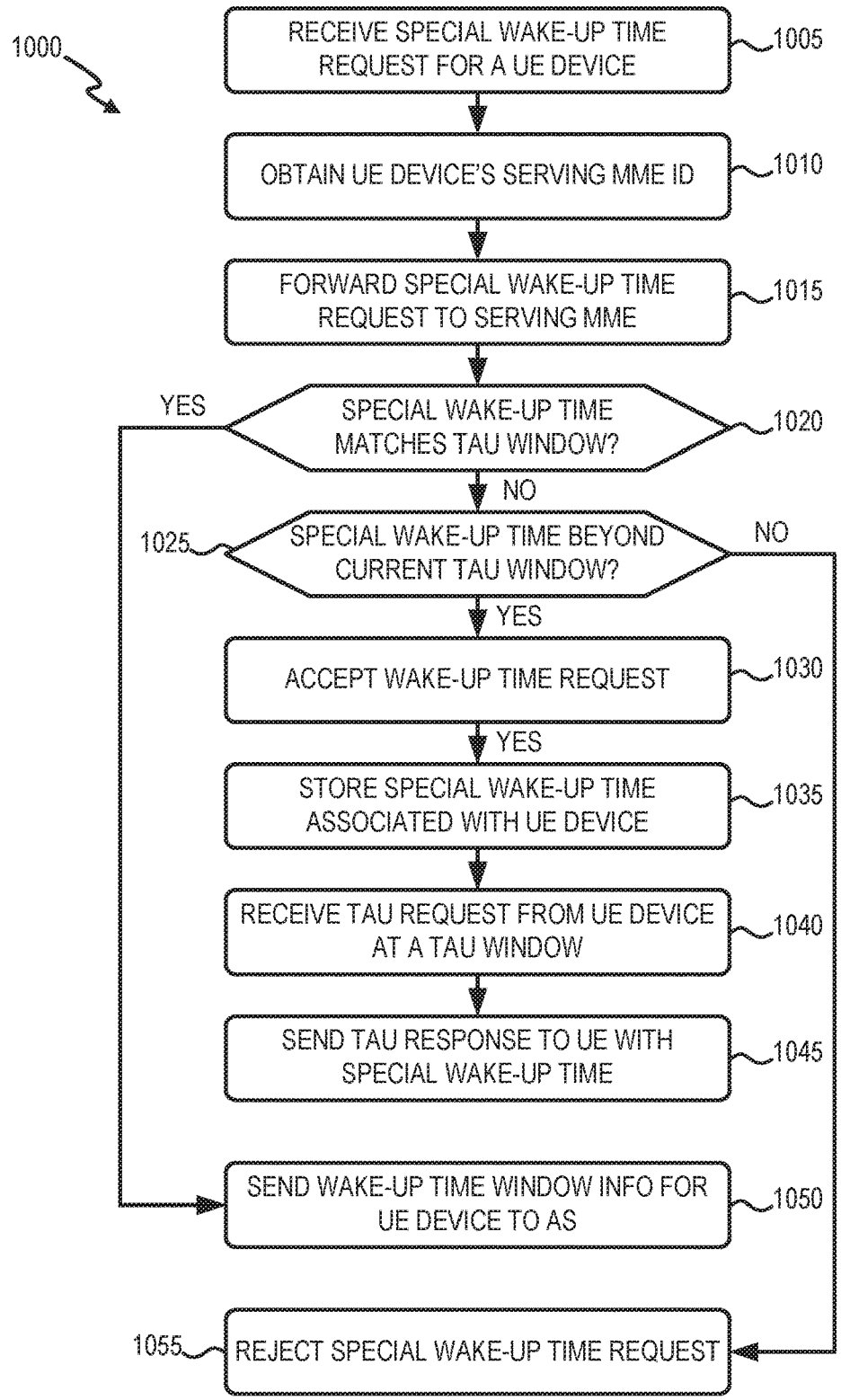
FIG. 10 is a flow diagram illustrating an exemplary process for implementing a special wake-up time request, according to an implementation described herein.

FIG. 10 is a flow diagram illustrating an exemplary process 1000 for managing a special wake-up time request, according to an implementation described herein. In one implementation, process 1000 may be implemented by MME 220 and SCEF 265. In another implementation, process 1000 may be implemented by MME 220 and SCEF 265 in conjunction with one or more other devices in network environment 100, such as HSS 250.

Referring to FIG. 10, process 1000 may include receiving a special wake-up time request for a UE device (block 1005), obtaining the UE device's serving MME ID (block 1010), and forwarding the special wake-up time request to the MME (block 1015). For example, SCEF 265 may receive a special wake-up time request from AS 140. The special wake-up time request may include a device ID for UE device 110 and a requested wake-up time for UE device 110. In response, SCEF 265 may submit an MME ID request (e.g., a UDR) to HSS 250 and receive a UDA to determine the identity of serving MME 220 for UE device 110. Using the identity of serving MME 220, SCEF 265 may forward the special wake-up time request to MME 220. In another implementation, SCEF 265 may forward the special wake-up time request directly to HSS 250 for HSS to forward to MME 220.

Process 1000 may further include determining if the special wake-up time matches an active TAU window for the UE device (block 1020). For example, MME 220 may receive the special wake-up time request and check if UE device 110 is currently awake and the requested special wake-up time is within the active timer of the UE device's PSM.

If the special wake-up time does not match a TAU window for the UE device (block 1020—NO), process 1000 may include determining if the special wake-up time is beyond a current TAU window (block 1025). For example, MME 220 may lookup network-designated TAU times for UE device 110 to determine if UE 110 will be able (e.g., be connected to the network) to receive a special wake-up time before the time designated in the special wake-up time request.

If the special wake-up time is beyond a current TAU window (block 1025—YES), process 1000 may include sending a wake-up request acceptance (block 1030) and storing the special wake-up time associated with the UE device (block 1035). For example, MME 220 may send a response to SCEF 265 that the special wake-up time request is accepted, which may be forwarded by SCEF 265 to AS 160. Alternatively, MME 220 may send an acceptance response to HSS 250, which may be forwarded to SCEF 265 and then to AS 160. MME 220 may store the special wake-up time for UE device 110 for later use.

Process 1000 may also include receiving a TAU request from the UE device at a TAU window (block 1040), and sending the TAU response to the UE device with the special wake-up time (block 1045). For example, MME 220 may receive a TAU request from UE device 110 at a point in time after receiving the special wake-up time request. MME 220 may provide a TAU response to UE device 110 that includes the designated wake-up time indicated in the special wake-up time request. UE device 110 may store the designated wake-up time and wake-up to send another TAU request at the designated wake-up time.

Returning to block 1020, if the special wake-up time matches a TAU window for the UE device (block 1020—YES), process 1000 may include sending the wake-up time information for the UE device to the application server (block 1050). For example, if the requested special wake-up time is within the current or the next active timer window of UE device 110's upcoming TAU request, MME 220 will respond to SCEF 265 with an indication that the request has been accepted and when UE device 110 will wake-up and/or for how long.

Returning to block 1025, if the special wake-up time is not beyond a current TAU window (block 1025—NO), process 1000 may include rejecting the special wake-up time request (block 1055). For example, if MME 220 determines that UE device 110 is asleep and will not awake before the time indicated in the special wake-up time request, MME 220 will reject the special wake-up time request, sending a rejection response to SCEF 265 (for forwarding to AS 140).

To support special wake-up for group of UE devices 110 (e.g., for software or firmware update), AS 140 may compile a UE device list, and the above process flow may be repeated for each UE on the list.

Figure 11:
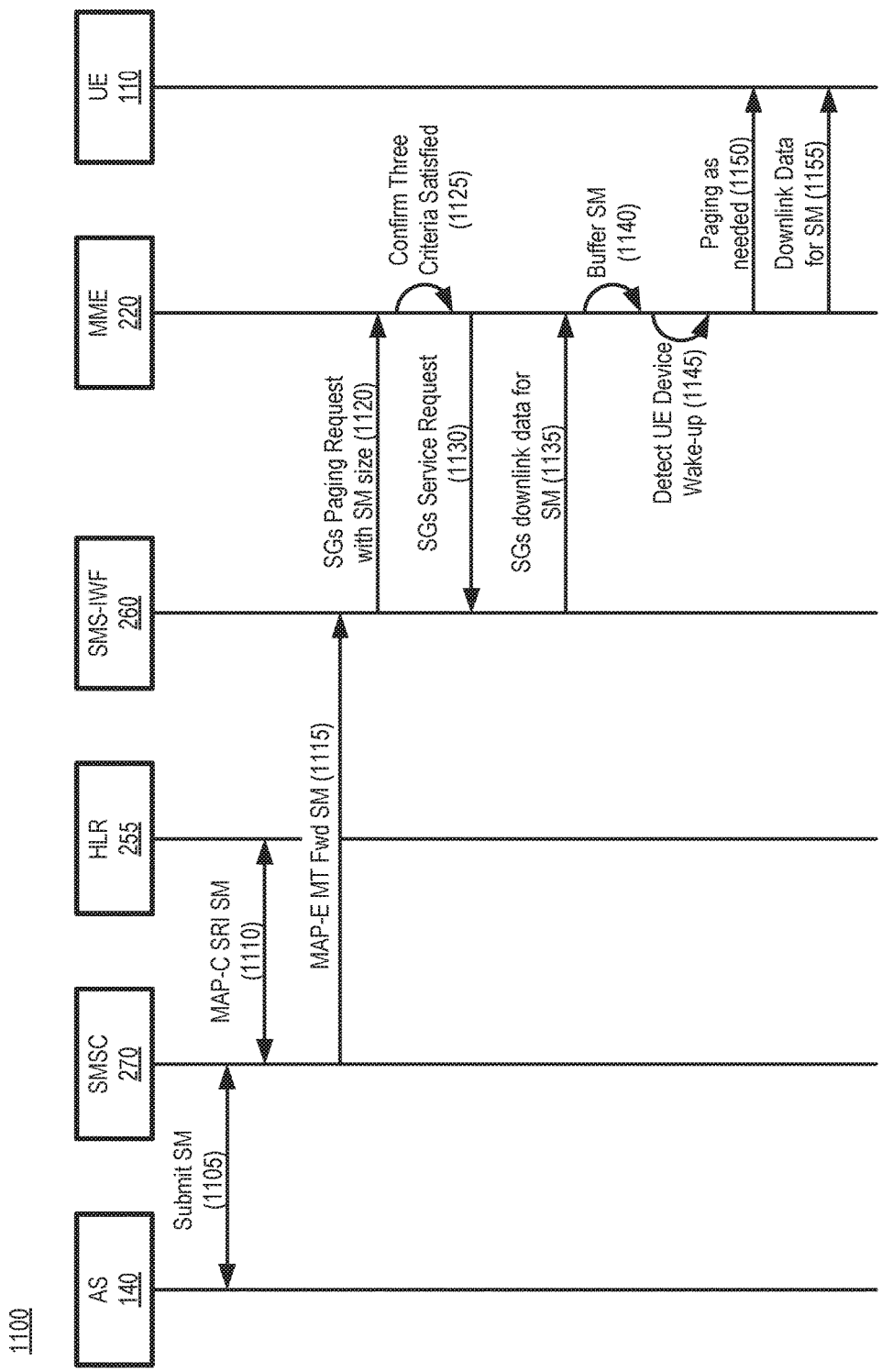
FIG. 11 is a diagram illustrating exemplary communications for implementing flexible buffering of mobile-terminated (MT) short messages at an MME in a portion of the network environment of FIG. 2.

FIG. 11 is a diagram illustrating exemplary communications between devices in a portion 1100 of environment 100. Communications in FIG. 11 represent communications to implement flexible buffering of MT SMs at an MME. As shown in FIG. 11, network portion 100 may include UE device 110, AS 140, MME 220, HLR 255, SMS-IWF 260, and SMSC 270. For communications in FIG. 11, AS 140 submits a MT SM to a sleeping UE device 110, where all buffering criteria (e.g., in SM buffer criteria 630) are satisfied. Communications shown in FIG. 11 are simplified for purposes of description, with some exchanges being combined or omitted.

As shown in FIG. 11, AS 140 may submit a SM 1105, addressed to UE device 110, via SMSC 270. SMSC 270 may receive SM 1105 and obtain routing information from HLR 255, as indicated by reference 1110. More particularly, SMSC 270 may send a SendRoutingInfoForSM (SRI SM) MAP-C message to HLR 255 requesting the present location of UE device 110. HLR 225 may return the requested routing information for UE device 110. Using this routing information, SMSC 270 may forward the SM to SMS-IWF 260 (e.g., via an MTForwardSM MAP-E message).

SMS-IWF 260 may receive the SM from SMSC 270 and determine the SM size. Using an enhanced SGs interface that utilizes an SM size parameter, SMS-IWF 260 may provide to MME 220 a paging request message 1120 that includes the size of the SM to be delivered. MME 220 may receive paging request message 1120 and confirm that the three criteria of SM buffer criteria 630 have been satisfied for the SM, as indicated by reference 1125.

After confirming the buffer criteria are satisfied, MME 220 may send a service request 1130 to SMS-IWF 260 to obtain the SM data, and SMS-IWF 260 may provide the downlink data 1135 for the SM (e.g., the message text, etc.). MME 220 may receive SM downlink data 1135 and buffer the SM, as indicated by reference 1140.

After a period of time (e.g., within the short time window of buffer time limit data 632 or a related variable), MME 220 may detect UE device 110 is in a wake-up window, as indicated by reference 1145. The wake-up window of UE device 110 may correspond to a paging window or active (receive/transmit) period for UE device 110. In one implementation, MME 220 may detect a UE device 110 wake-up based on wake-up log 620. In another implementation, MME 220 may detect a UE device 110 wake-up based on receiving a TAU request. Based on the detecting 1145, MME 220 may send one or more paging signals 1150 (e.g., via eNB 210, not shown in FIG. 11) to UE device 110 and, upon receiving an acknowledgement, send the downlink SM data 1155 to UE device 110.

Figure 12:
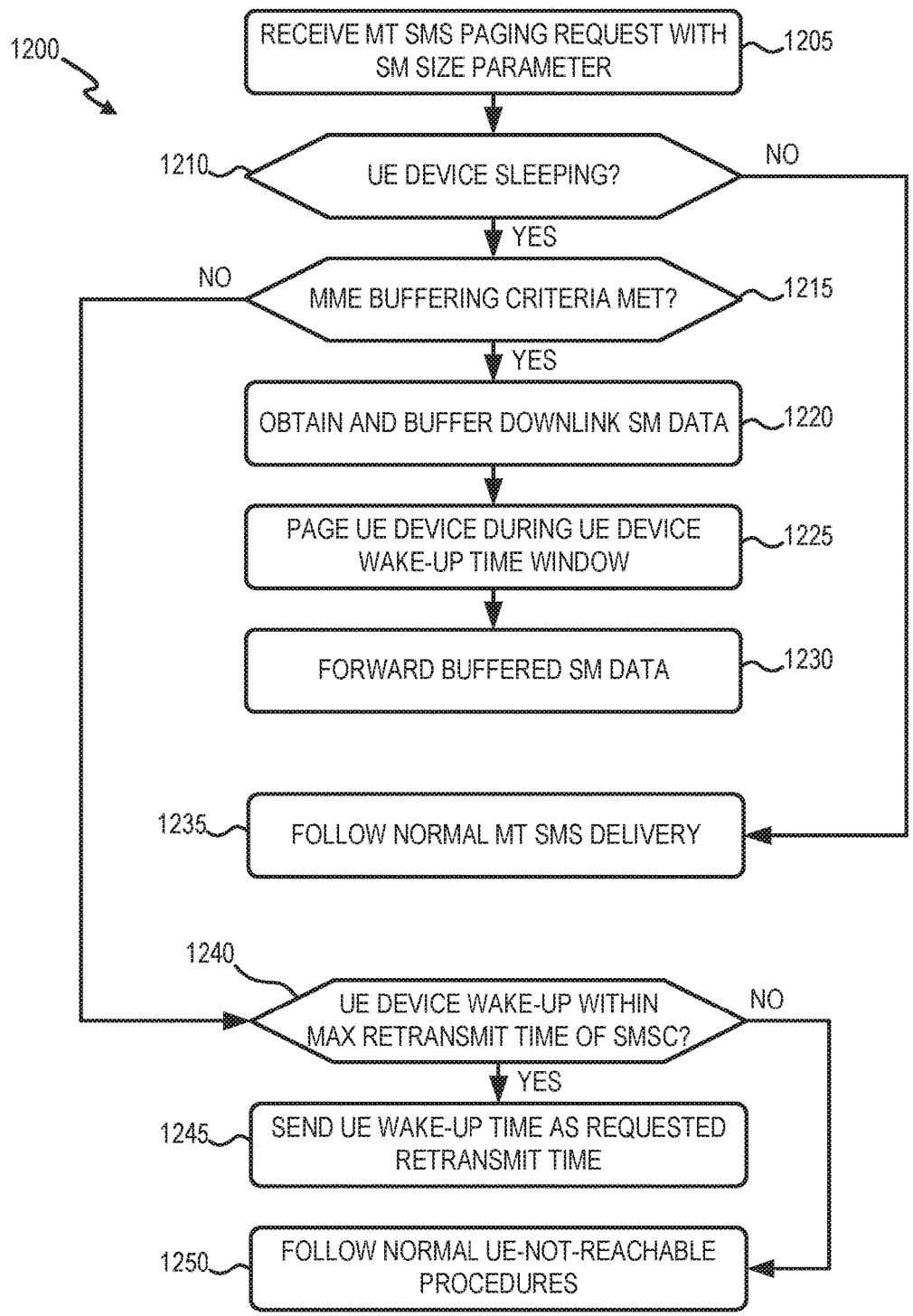
FIGS. 12 and 13 are flow diagrams illustrating an exemplary process for implementing flexible buffering of MT SMs, according to an implementation described herein.

FIG. 12 is a flow diagram illustrating an exemplary process 1200 for flexible buffering of MT SMs at an MME, according to an implementation described herein. In one implementation, process 1000 may be implemented by MME 220 and SCEF 265. In another implementation, process 1000 may be implemented by MME 220 and SCEF 265 in conjunction with one or more other devices in network environment 100, such as HSS 250.

Referring to FIG. 12, process 1200 may include receiving an MT SMS paging request with an SM size parameter (block 1205) and determining if an addressed UE device is sleeping (block 1210). For example, MME device 220 may receive an MT SMS paging request, from SMS-IWF 260, for UE device 110. The MT SMS paging request may include a message size parameter with a size of the particular SM sent by AS 140. MME 220 may refer to UE wake-up log 620 to determine if UE device 110 is sleeping. Thus, in one implementation, MME 220 may determine that UE device 110 is sleeping without paging UE device 110 (e.g., via eNB 210). In another implementation, MME 220 may page UE device 110 to determine it UE device 110 is sleeping.

If the UE device is sleeping (block 1210—YES), process 1200 may include determining if MME buffering criteria are met (block 1215). For example, if MME 220 determines that UE device 110 is asleep, MME 220 may apply the SM size (from the size parameter in the MT SMS paging request), along with wake-up time data from wake-up log 620, to buffering criteria 630 to determine if all the criteria are met. In another implementation, MME 220 may apply flexible controls for SM buffering based on buffering criteria 630.

If the MME buffering criteria are met (block 1215—YES), process 1200 may include obtaining and buffering downlink SM data (block 1220), paging the UE device during a UE device wake-up time window (block 1225), and forwarding the buffered SM data (block 1230). For example, if MME 220 determines that buffering criteria 630 are met (either by strict application or flexible controls), MME 220 may send a service request to SMS-IWF 260 to obtain the SM data, and SMS-IWF 260 may provide the downlink data for the SM to MME 220. MME 220 may then buffer the SM downlink data until a next wake-up time for UE device 110. At the next wake-up time, MME 220 may initiate paging for UE device 110 (via eNB 210). When UE device 110 responds to the page, MME 220 may forward the SM to UE device 110.

Returning to block 1210, if the UE device is not sleeping (block 1210—NO), process 1200 may include following normal MT SMS delivery (block 1235). For example, if UE device 110 is awake when the MT SMS paging request is received, MME 220 may not apply buffering criteria 630.

Returning to block 1215, if the MME buffering criteria are not met (block 1215—NO), process 1200 may include determining if the UE device will wake up within the maximum retransmit time of the SMSC (block 1240). For example, the MT SMS paging request may include a maximum retransmission time for the SMSC 270 that is handling the SM. If MME 220 cannot buffer the SM, MME 220 may determine (e.g., using UE wake-up log 620) that the UE device 110 wake-up time is within the maximum retransmission time for SMSC 270 and may send the UE device wake-up time to SMSC 270 as the requested retransmission time.

If the UE device will wake up within the maximum retransmission time of the SMSC (block 1240—YES), process 1200 may include sending the UE wake-up time to the SMSC as the requested retransmission time (block 1245). For example, the maximum retransmission time for SMSC 270 may be passed from SMSC 270 to SMS-IWF 260 with the MAP-E MT Fwd SM (e.g., FIG. 11, 1115), then to MME with the SGs paging request 1120. MME 220 may identify the wake-up time of UE device 110 (e.g., from UE wake-up log 620) as within the retransmission window of SMSC 270 and respond to the paging request with a retransmission time equal to the UE device 110 wake-up time.

If the UE device will not wake up within the maximum retransmission time of the SMSC (block 1240—NO), process 1200 may include following normal UE-not-reachable procedures (block 1250). For example, MME 220 may respond to the paging request from SMS-IWF 260 with a failed SM delivery message.

Figure 13:
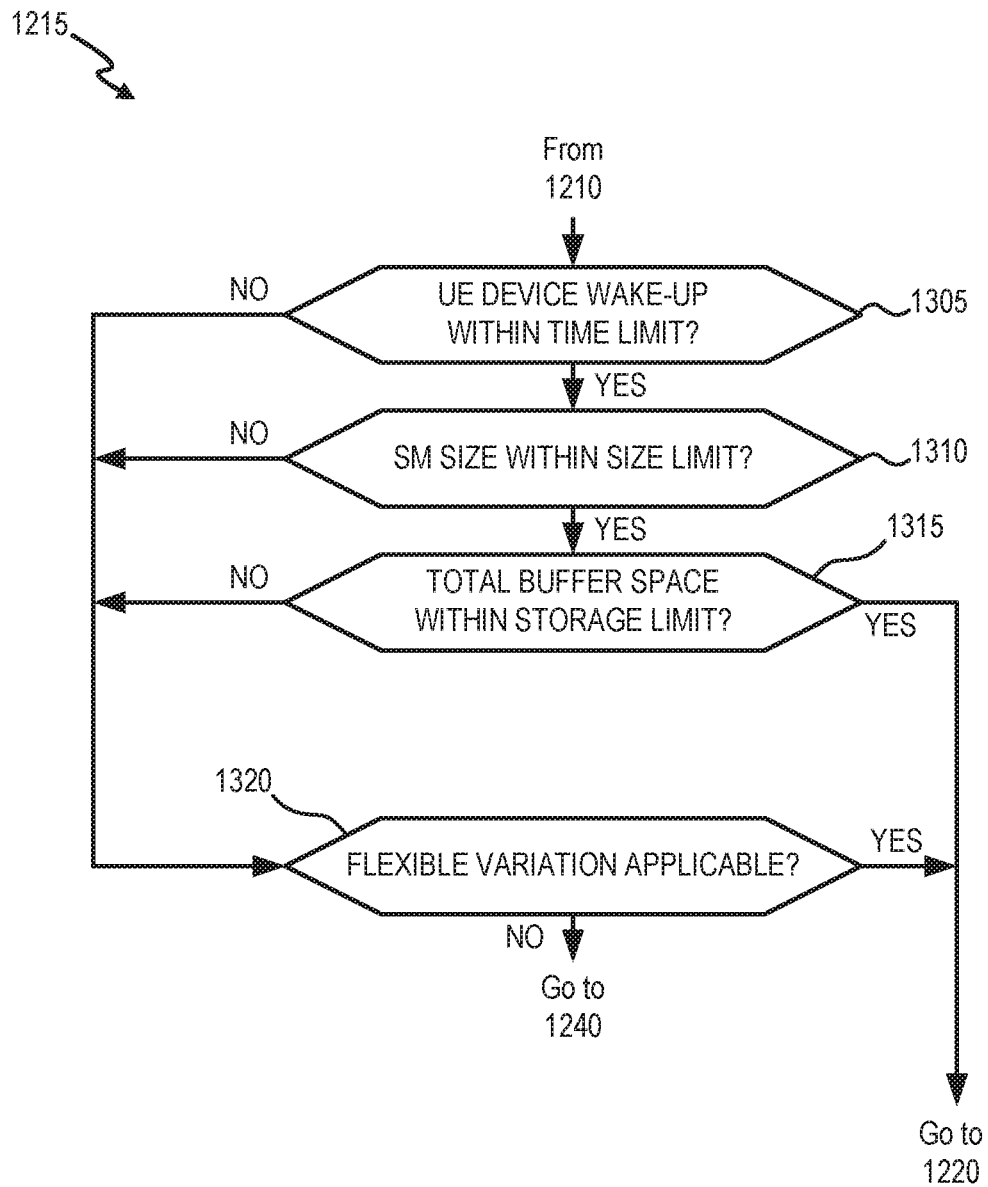

Process block 1215 may include process blocks shown in FIG. 13. As shown in FIG. 13 process block 1215 may include determining if the UE device will wake-up within the time configured limit (block 1305), determining if SM size is within the configured size limit (block 1310), and determining if the total buffer space is within the configured storage limit (block 1315). For example, MME 220 (e.g., SM buffer manager 640) may compare data from the SMS-IWF 260 paging request (e.g., paging request 1120) with SM buffer criteria 630 to determine if buffering by ME 220 is possible. Particularly, MME 220 may compare the buffer time limit data 632 against the next wake-up time for UE device 110; compare buffer SM size limit data 634 against the SM size in paging request 1120; and compare buffer total size limit data 636 against the total buffered SM data plus the SM size in paging request 1120. If all of the SM buffer criteria are met (block 1215—YES), process block 1215 may proceed to process block 1220 of FIG. 12.

If one or more of the SM buffer criteria are not met (block 1305, block 1310, block 1315—NO), process block 1215 may include determining if a flexible variation of the buffer criteria is applicable (block 1320). For example, MME 220 may apply one or more flexible controls described above in connection with SM buffer manager 640 (FIG. 6A). If a flexible variation of the buffer criteria is applicable (block 1320—YES), process block 1215 may proceed to process block 1220 of FIG. 12. If a flexible variation of the buffer criteria is not applicable (block 1320—NO), process block 1215 may proceed to process block 1240 of FIG. 12.

Systems and methods described herein may provide improved access to wireless devices in PSM and eDRX sleep. An MME may receive a MT SMS paging request with a size parameter for a corresponding short message. The MME may determine if the wireless device is sleeping, and, if so, use the size parameter to determine if criteria are met for local buffering by the MME. If the local buffering criteria are met, the MME may locally buffer the short message until a next wireless device wake-up time. The MME also may receive and process requests to implement non-standard wake-up times for individual wireless devices in PSM sleep.

According to implementations described herein, SM retransmissions to eDRX/PSM UE devices can be significantly reduced. Reduction of the SM retransmissions in turn can significantly reduce SMS retransmission signaling that impacts the MME, the SMS-IWF, the HLR and the SMSC. In addition, the flexible SM buffering approach describe herein has no impact to UE devices that do not use eDRX or PSM. Furthermore, special wake-up times requested by an AS may be implemented without requiring changes to standards for UE devices.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIGS. 10 and 12, and message/operation flows with respect to FIGS. 9A, 9B and 11, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a first network device, a wake-up time request for a wireless device, wherein the wake-up time request includes a designated wake-up time for the wireless device to receive data services;
   storing, by the first network device, the designated wake-up time when the designated wake-up time is after a current tracking area update (TAU) window for the wireless device;
   receiving, by the first network device and after the storing, a TAU request for the wireless device; and
   sending, by the first network device and in response to the TAU request, a TAU response that includes the designated wake-up time.

2. The method of claim 1, wherein the first network device is a mobility management entity (MME) device, and wherein the wake-up time request is received by the MME device from a service capability exposure function (SCEF) device.

3. The method of claim 2, further comprising:
   sending, by the MME to the SCEF device, an acknowledgement that the wake-up time request is accepted.

4. The method of claim 3, further comprising:
   receiving, by the SCEF device, the wake-up time request from an application server (AS) device via a first interface;
   obtaining, by the SCEF device, an identity of the MME device that is serving the wireless device; and
   forwarding, by the SCEF device, the wake-up time request to the MME device via a second interface.

5. The method of claim 4, further comprising:
   receiving, by the SCEF device, the acknowledgement; and
   sending, by the SCEF device, the acknowledgement to the AS device.

6. The method of claim 4, wherein obtaining the identity of the MME device comprises:
   sending a user data request to another network device, and
   receiving a user data answer from the other network device.

7. The method of claim 6, wherein the other network device includes home subscriber server (HSS) device.

8. The method of claim 1, further comprising:
   receiving, by the first network device, another TAU request from the wireless device at the designated wake-up time.

9. A system, comprising:
   a first network device including:
      a first memory to store first instructions; and
      a first processor to execute the first instructions to:
         receive a wake-up time request for a wireless device, wherein the wake-up time request includes a designated wake-up time for the wireless device to receive data services;
         store the designated wake-up time when the designated wake-up time is after a current tracking area update (TAU) window for the wireless device;
         receive, after the storing, a TAU request for the wireless device; and
         send, in response to the TAU request, a TAU response that includes the designated wake-up time.

10. The system of claim 9, wherein the first network device includes a mobility management entity (MME) device.

11. The system of claim 9, wherein the first processor is further to execute the first instructions to:
    send, to a second network device, an acknowledgement that the wake-up time request is accepted.

12. The system of claim 9, further comprising:
    a second network device including:
       a second memory to store second instructions; and
       a second processor to execute the second instructions to:
          receive the wake-up time request from an application server (AS) device via a first interface;
          obtain an identity of the first network device that is serving the wireless device; and
          forward the wake-up time request to the first device via a second interface.

13. The system of claim 12, wherein the second network device includes a service capability exposure function (SCEF) device.

14. The system of claim 12, wherein the second processor is further to execute the second instructions to:
    receive an acknowledgement that the wake-up time request is accepted; and
    send the acknowledgement to the AS device.

15. The system of claim 12, wherein the first processor is further to execute the first instructions to:
    receive another TAU request from the wireless device at the designated wake-up time.

16. A non-transitory computer-readable medium containing instructions executable by at least one processor, the computer-readable medium comprising one or more instructions to:
    receive, from a first network device, a wake-up time request for a wireless device, wherein the wake-up time request includes a designated wake-up time for the wireless device to receive data services;
    store the designated wake-up time when the designated wake-up time is after a current tracking area update (TAU) window for the wireless device;
    receive, from the first network device and after the storing, a TAU request for the wireless device; and
    send, to the first network device and in response to the TAU request, a TAU response that includes the designated wake-up time.

17. The non-transitory computer-readable medium of claim 16, further comprising one or more instructions to:
    send, to an application server (AS) device, an acknowledgement that the wake-up time request is accepted.

18. The non-transitory computer-readable medium of claim 16, further comprising one or more instructions to:
    receive another TAU request from the wireless device at the designated wake-up time.

19. The non-transitory computer-readable medium of claim 16, further comprising one or more instructions to:
    receive the wake-up time request from an application server (AS) device via a first interface;
    obtain an identity of an MME device that is serving the wireless device; and
    forward the wake-up time request to the MME device via a second interface.

20. The non-transitory computer-readable medium of claim 19, wherein the instructions to obtain the identity of the MME device further includes one or more instructions to:
    generate a user data request for a third network device to provide the identity of the MME device.

* * * * *